USO11320271B2

United States Patent
Miyao et al.

(10) Patent No.: US 11,320,271 B2
(45) Date of Patent: May 3, 2022

(54) POSITIONING DEVICE

(71) Applicants: DENSO CORPORATION, Kariya (JP); TOYOTA JIDOSHA KABUSHIKI KAISHA, Toyota (JP)

(72) Inventors: Masanori Miyao, Kariya (JP); Kentaro Asai, Okazaki (JP); Yosuke Moriuchi, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

(21) Appl. No.: 16/911,782

(22) Filed: Jun. 25, 2020

(65) Prior Publication Data
US 2020/0326190 A1  Oct. 15, 2020

Related U.S. Application Data

(63) Continuation of application No. PCT/JP2018/043009, filed on Nov. 21, 2018.

(30) Foreign Application Priority Data

Dec. 27, 2017 (JP) .............................. JP2017-251380

(51) Int. Cl.
*G01S 19/48* (2010.01)
*G01S 19/09* (2010.01)
*G01S 19/16* (2010.01)
*G01C 21/28* (2006.01)
(Continued)

(52) U.S. Cl.
CPC .............. *G01C 21/28* (2013.01); *G01S 19/09* (2013.01); *G01S 19/16* (2013.01); *G01S 19/48* (2013.01); *G01S 19/23* (2013.01); *G01S 19/25* (2013.01)

(58) Field of Classification Search
CPC .......... G01S 19/09; G01S 19/48; G01S 19/16; G01S 19/21–215; G01S 5/01; G01S 5/011–019; G01S 5/485; G01S 5/0263; G01S 5/0036; G01S 5/0054; G01S 5/14
See application file for complete search history.

(56) References Cited

U.S. PATENT DOCUMENTS 5,952,969 A * 9/1999 Hagerman ............ H04W 64/00
                                               342/457
6,519,466 B2 * 2/2003 Pande ................... G01S 5/0009
                                               342/357.64
(Continued)

FOREIGN PATENT DOCUMENTS

JP  2015059905 A  3/2015

OTHER PUBLICATIONS

Kaplan et al., "Understanding GPS Principles and Applications", 2006, Artech House, 2nd edition, pp. 522-526 (Year: 2006).*

*Primary Examiner* — Cassi J Galt
(74) *Attorney, Agent, or Firm* — Harness, Dickey & Pierce, P.L.C.

(57) ABSTRACT

A positioning device performs positioning to measure a position of a vehicle. The positioning device receives a signal transmitted from a GNSS satellite. The positioning device perform a positioning calculation using the signal. The positioning device communicates with a positioning server. The positioning device selects, as a system for the positioning, one of a first positioning system and a second positioning system.

6 Claims, 13 Drawing Sheets

(51) Int. Cl.
G01S 19/23 (2010.01)
G01S 19/25 (2010.01)

(56) References Cited

U.S. PATENT DOCUMENTS

| | | | |
|---|---|---|---|
| 8,188,912 B1* | 5/2012 | Weisenburger | G01S 19/48 |
| | | | 342/357.24 |
| 10,551,508 B2* | 2/2020 | Duan | G01S 19/42 |
| 2009/0325592 A1* | 12/2009 | Jang | G01S 19/48 |
| | | | 455/456.1 |
| 2013/0176169 A1* | 7/2013 | Harmon | G01S 19/48 |
| | | | 342/357.28 |

\* cited by examiner

POSITIONING DEVICE

CROSS REFERENCE TO RELATED APPLICATIONS

The present application is a continuation application of International Patent Application No. PCT/JP2018/043009 filed on Nov. 21, 2018, which designated the U.S. and claims the benefit of priority from Japanese Patent Application No. 2017-251380 filed on Dec. 27, 2017. The entire disclosures of all of the above applications are incorporated herein by reference.

TECHNICAL FIELD

The present disclosure relates to a positioning device that measures a position of a vehicle.

BACKGROUND

A positioning device including a plurality of positioning systems to measure a position of a mobile object using GNSS has been proposed. GNSS stands for Global Navigation Satellite System and is a generic term for satellite positioning systems such as GPS, GLONASS, Galileo, and quasi-zenith satellites. The above-described positioning systems mainly include a UE-based system and a UE-assisted system. The UE-based system allows the positioning device to perform the positioning calculation. The UE-assisted system allows a positioning server to perform the positioning calculation.

SUMMARY

The present disclosure provides a positioning device that performs positioning to measure a position of a vehicle. The positioning device receives a signal transmitted from a GNSS satellite. The positioning device perform a positioning calculation using the signal. The positioning device communicates with a positioning server. The positioning device selects, as a system for the positioning, one of a first positioning system and a second positioning system.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
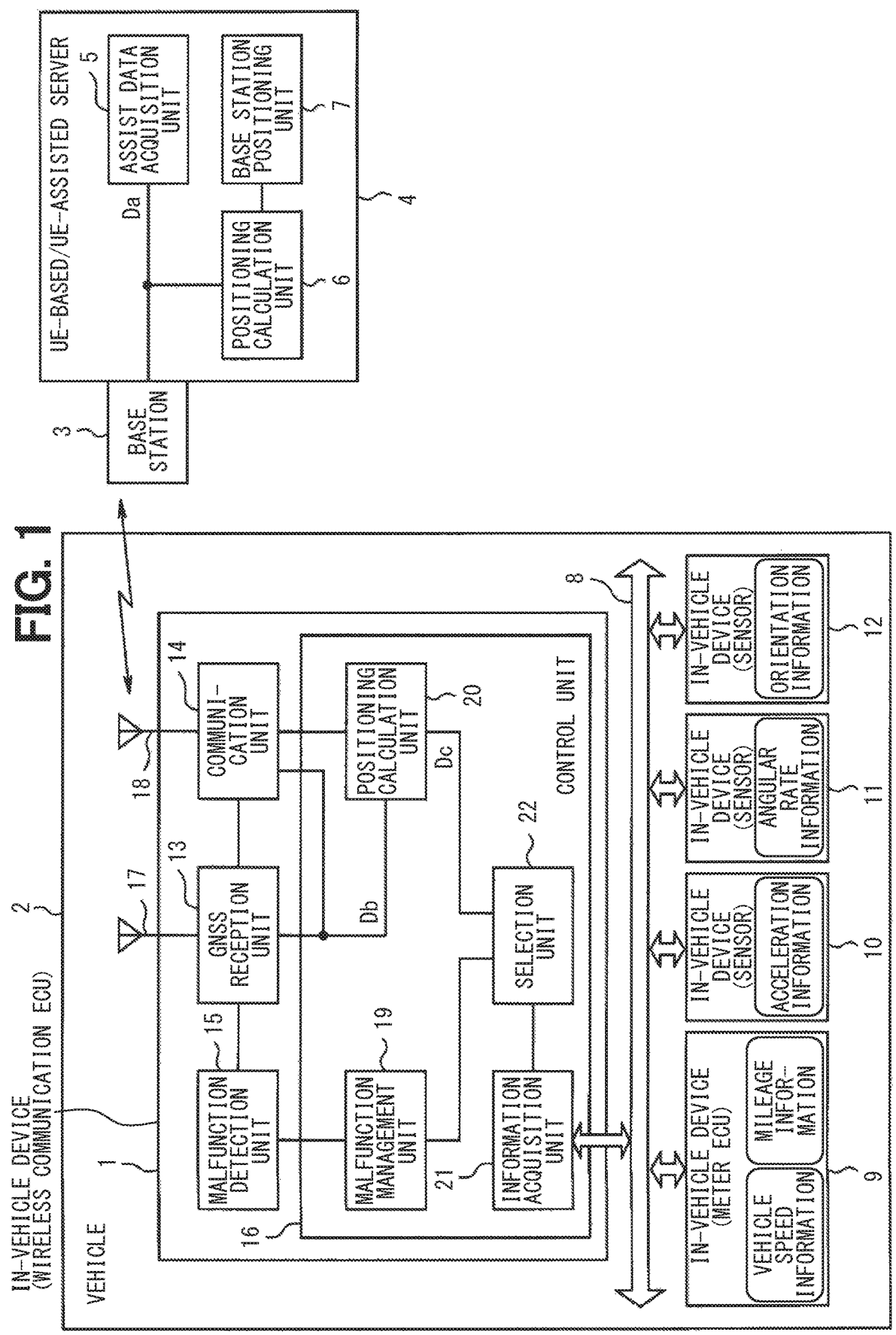
FIG. 1 is a diagram schematically illustrating a configuration of an in-vehicle device and a positioning server according to a first embodiment.

For example, a positioning device include a UE-based system and a UE-assisted system. The UE-based system has an advantage of enabling the positioning device to decrease power consumption because the UE-based system wirelessly communicates with a positioning server less frequently than the UE-assisted system. However, the UE-based system has a disadvantage of failing to acquire a positioning result when a mobile object having the positioning device is located in an environment unfavorable to the positioning such as an urban canyon that makes positioning satellites hardly visible.

The UE-assisted system has an advantage of avoiding failing to acquire the positioning result because the UE-assisted system can acquire the positioning result from a base station, namely, backup positioning result in a case where the wireless communication with the positioning server is available even when the positioning device is incapable of positioning. However, the UE-assisted system has a disadvantage of allowing the positioning device to consume a large amount of power because the UE-assisted system wirelessly communicates with the positioning server more frequently than the UE-based system.

One of the proposed positioning devices employs the UE-based system as a positioning system to acquire the positioning result during a normal operation while maintaining the low power consumption for the positioning device. The positioning device changes the positioning system to the UE-assisted system when the number of visible satellites goes below a predetermined threshold value in the UE-based system to avoid a situation of failing to acquire the positioning result.

The above-described technique presupposes the use of the positioning device for a mobile terminal, and therefore selects a positioning system appropriate for the reduction of power consumption in the positioning device. However, the positioning device used for a vehicle is considered to give preference to the improvement of the positioning accuracy over the reduction of power consumption. It is favorable to select an appropriate positioning system focused on the improvement of the positioning accuracy.

The present disclosure to provide a positioning device capable of selecting a positioning system appropriate for vehicle positioning.

An exemplary embodiment of the present disclosure provides a positioning device that performs positioning to measure a position of a vehicle. The positioning device includes a device-side reception unit, a device-side calculation unit, a communication unit, a selection unit, and an information acquisition unit. The device-side reception unit receives a signal transmitted from a GNSS satellite. The device-side calculation unit performs a positioning calculation based on the signal received by the device-side reception unit. The communication unit communicates with a positioning server that includes an assist data acquisition unit configured to acquire GNSS assist data and a server calculation unit configured to perform the positioning calculation based on the GNSS assist data. The selection unit selects, as a system for the positioning, one of a first positioning system and a second positioning system. The first positioning system acquires a positioning result as a result of the positioning by the device-side calculation unit preforming the positioning calculation. The first positioning system may be UE-Based system. The second positioning system configured to acquire the positioning result by the server calculation unit preforming the positioning calculation. The second may be UE-Assisted system. The information acquisition unit acquires vehicle travel information that is available from a device provided in the vehicle, related to a travel of the vehicle, and different from information used for the positioning. The vehicle travel information may be information acquired from sensors such as an acceleration sensor, a gyro sensor, a speedometer, an odometer, or a compass mounted on the vehicle. When the first positioning system is selected, the selection unit determines whether the positioning result is valid based on the vehicle travel information. When determining that the positioning result is invalid, the selection unit changes the system to the second positioning system.

In the exemplary embodiment of the present disclosure, the accuracy of positioning result acquired from the first positioning system, that is, the positioning accuracy based on the signal transmitted from the GNSS satellite is easily affected from the outside such as the location of GNSS satellites or multipath due to buildings and other vehicles exiting around a subject vehicle. The vehicle travel information from the sensor mounted on the vehicle is acquired in a closed environment of the vehicle. Thus, the vehicle travel information is difficult to be affected from the outside, and ensures high stability. The use of the vehicle travel information acquired from the sensor can estimate information about position of the vehicle such as travel amount or travel direction of the vehicle.

According to the above-described configuration, the selection unit verifies the validity of the positioning result based on the vehicle travel information while the first positioning system is selected. When determining that the positioning result is invalid, the selection unit changes the positioning system to the second positioning system. The selection unit selects the positioning system to acquire a highly accurate positioning result. The above-described configuration selects an appropriate positioning system with an emphasis on the improvement of the positioning result accuracy. It is possible to select an appropriate positioning system used for positioning of the vehicle.

Embodiments of the present disclosure will be described with reference to the accompanying drawings. The mutually corresponding parts in the following embodiment are designated by the same reference numerals and a detailed description is omitted for simplicity.

First Embodiment

The first embodiment will be described with reference to FIGS. 1 through 9.

An in-vehicle device 1 as illustrated in FIG. 1 is used for positioning to measure a position of a vehicle 2 and corresponds to a positioning device. The in-vehicle device 1 includes three positioning systems such as a standalone system, a UE-based system, and a UE-assisted system and is capable of selectively performing a positioning operation corresponding to each system.

The in-vehicle device 1 may be provided as a wireless communication ECU such as a DCM (data communication module). The ECU stands for an electronic control unit. The in-vehicle device 1 includes a cellular communication function and makes a wireless connection with a base station 3 connected to a cellular communication network to be capable of communicating with a positioning server 4 connected to the base station 3.

The positioning server 4 includes a UE-based server and a UE-assisted server and is installed in an information center, for example. The positioning server 4 includes an assist data acquisition unit 5, a positioning calculation unit 6, and a base station positioning unit 7. The assist data acquisition unit 5 acquires GNSS assist data Da acquired by positioning at the base station 3. The positioning calculation unit 6 corresponds to a server calculation unit. When the UE-assisted system is used for positioning, the positioning calculation unit 6 uses GNSS assist data Da to perform positioning calculation. The base station positioning unit 7 acquires positioning information by using an alternative positioning system such as the triangulation based on a communication delay between the in-vehicle device 1 and a plurality of base stations in the cellular communication network.

The in-vehicle device 1 is capable of communicating with other in-vehicle devices 9 through 12 as instruments provided is the vehicle 2 by using a communication network 8 provided by an in-vehicle LAN such as CAN. The in-vehicle device 9 is provided by a meter ECU mainly including a speedometer and an odometer and has vehicle speed information indicative of speed of the vehicle 2 and mileage information indicative of the mileage of the vehicle 2. The in-vehicle device 10 is provided by an ECU including an acceleration sensor and has acceleration information indicative of acceleration of the vehicle 2. The in-vehicle device 11 is provided by an ECU including an angular rate sensor and has angular rate information indicative of angular rate of the vehicle 2. The in-vehicle device 12 is provided by an ECU including a compass and has orientation information indicative of orientation that is a travel direction of the vehicle 2.

The in-vehicle device 1 includes a GNSS reception unit 13, a communication unit 14, a malfunction detection unit 15, and a control unit 16. The GNSS reception unit 13 includes a GNSS antenna 17 and uses the GNSS antenna 17 to receive signals periodically transmitted from a GNSS satellite. The GNSS reception unit 13 corresponds to a device-side reception unit and a device-side receiver. The GNSS antenna 17 is configured as an in-vehicle antenna mounted on the vehicle 2. The GNSS reception unit 13 outputs GNSS positioning information Db indicated by a received signal to the control unit 16. The GNSS positioning information Db includes the satellite orbit data and the positioning time signal information.

The communication unit 14 includes a communication antenna 18 and uses the communication antenna 18 to perform wireless communication with the positioning server 4. The communication antenna 18 is configured as an in-vehicle antenna mounted on the vehicle 2. The communication unit 14 receives data from the positioning server 4 and outputs the data to the control unit 16. Data received from the positioning server 4 includes the GNSS assist data. The communication unit 14 is supplied with information from the control unit 16 and transmits the information to the positioning server 4. Information supplied from the control unit 16 includes GNSS positioning information Db. The communication unit 14 corresponds to a transceiver.

The malfunction detection unit 15 detects a malfunction on the GNSS reception unit 13, particularly, the GNSS antenna 17. The malfunction on the GNSS antenna 17 mainly include connection abnormalities such as disconnection and short-circuiting. The malfunction detection unit 15 outputs a detection signal indicative of a result of malfunction detection to the control unit 16. The control unit 16 controls overall operations of the in-vehicle device 1 and is generally configured as a microcomputer mainly including a CPU, ROM, and RAM.

The control unit 16 includes a malfunction management unit 19, a positioning calculation unit 20, an information acquisition unit 21, and a selection unit 22. The malfunction management unit 19, the positioning calculation unit 20, the information acquisition unit 21, and the selection unit 22 are embodied as software in such a manner that the CPU of the control unit 16 executes a program stored in the ROM, for example.

The malfunction management unit 19 determines the malfunction of the GNSS antenna 17, that is, the presence or absence of an abnormality based on a detection signal supplied from the malfunction detection unit 15. When determining a malfunction occurrence on the GNSS antenna 17, the malfunction management unit 19 notifies the selection unit 22 of the malfunction. Instead of or in place of this notification, it may store dialog information indicative of the abnormality of the GNSS antenna 17. In this case, the selection unit 22 reads the dialog information and is capable of determining the presence or absence of the malfunction of the GNSS antenna 17.

The positioning calculation unit 20 corresponds to a device-side calculation unit. When the standalone system is used for positioning, the positioning calculation unit 20 performs the positioning calculation by using GNSS positioning information Db supplied from the GNSS reception unit 13. When the UE-based system is used for positioning, the positioning calculation unit 20 performs the positioning calculation by using GNSS positioning information Db and data output from the communication unit 14, namely, GNSS assist data Da received from the positioning server 4. The positioning calculation unit 20 outputs positioning result Dc that results from the positioning calculation to the selection unit 22. The positioning result Dc is also denoted as a GNSS positioning result.

The information acquisition unit 21 communicates with the in-vehicle devices 9 through 12 provided in the vehicle 2 via the communication network 8 and acquires vehicle travel information that concerns the travel of the vehicle 2 and is capable of being acquired from the in-vehicle devices 9 through 12. Specifically, the vehicle travel information is acquired from the sensors such as the speedometer, the odometer, the acceleration sensor, the angular rate sensor, and the compass mounted on the vehicle and differs from the information used for positioning. The information acquisition unit 21 outputs the acquired vehicle travel information to the selection unit 22.

The selection unit 22 selects one of the three positioning systems, namely, the standalone system, the UE-based system, and the UE-assisted system. As will be described in detail later, the selection is made mainly based on the malfunction notification supplied from the malfunction management unit 19, the vehicle travel information supplied from the information acquisition unit 21, and the positioning result Dc supplied from the positioning calculation unit 20. The in-vehicle device 1 performs the positioning based on the system selected by the selection unit 22. In the description below, a standalone operation signifies that the in-vehicle device 1 performs the positioning under the standalone system. A UE-based operation signifies that the in-vehicle device 1 performs the positioning under the UE-based system. A UE-assisted operation signifies that the in-vehicle device 1 performs the positioning under the UE-assisted system.

According to the present embodiment, the standalone system and the UE-based system are configured so that the positioning calculation unit 20 of the in-vehicle device 1 performs positioning calculation to acquire a positioning result as a result of positioning. The standalone system and the UE-based system correspond to a first positioning system. The UE-assisted system is configured so that the positioning calculation unit 6 of the positioning server 4 performs positioning calculation to acquire a positioning result. The UE-assisted system corresponds to a second positioning system.

Figure 2:
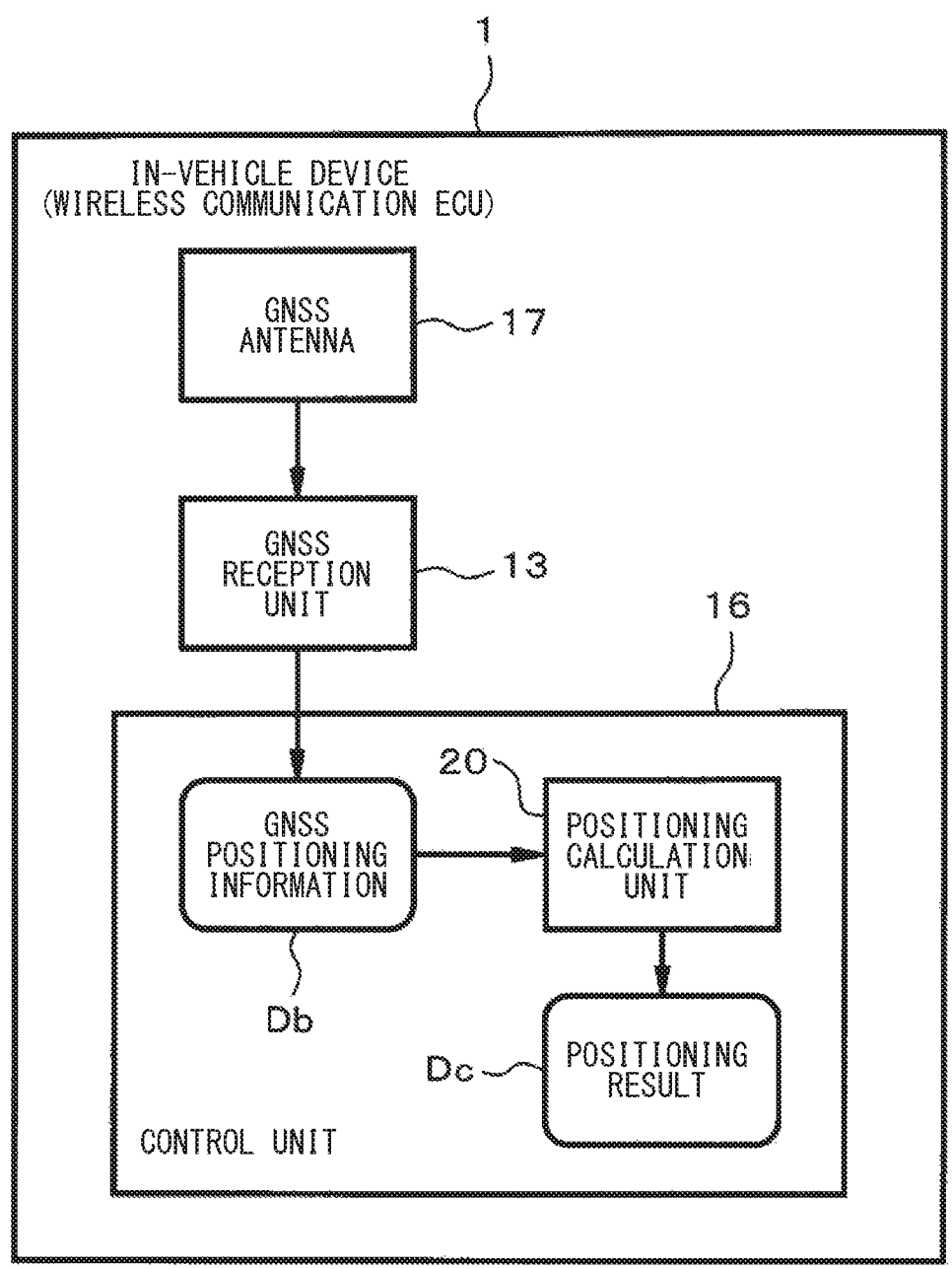
FIG. 2 is a diagram illustrating a standalone operation according to the first embodiment and schematically illustrating a configuration of the in-vehicle device directly related to the standalone operation.
Figure 3:
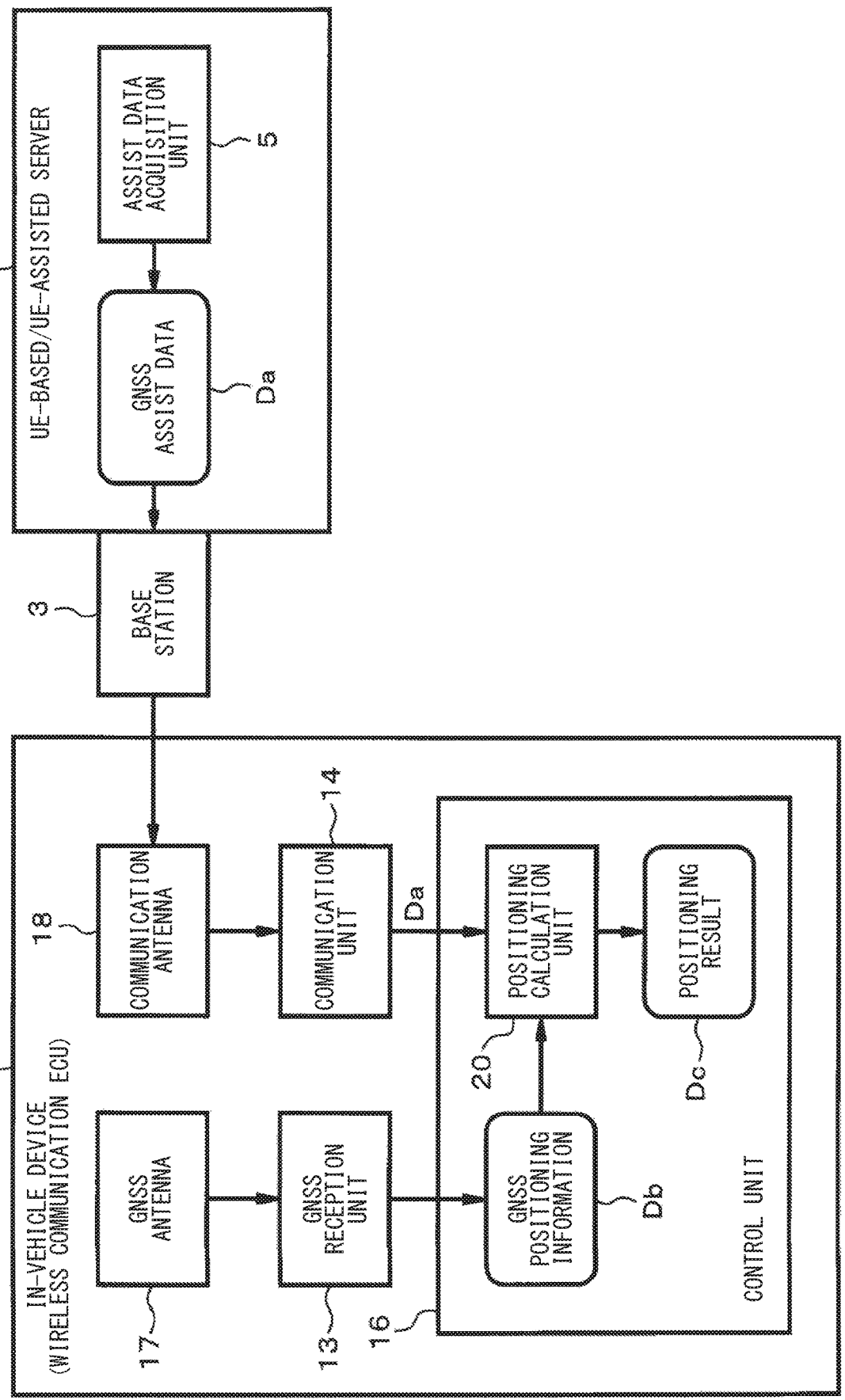
FIG. 3 is a diagram illustrating a UE-based operation according to the first embodiment and schematically illustrating a configuration of the in-vehicle device and the positioning server directly related to the UE-based operation.
Figure 4:
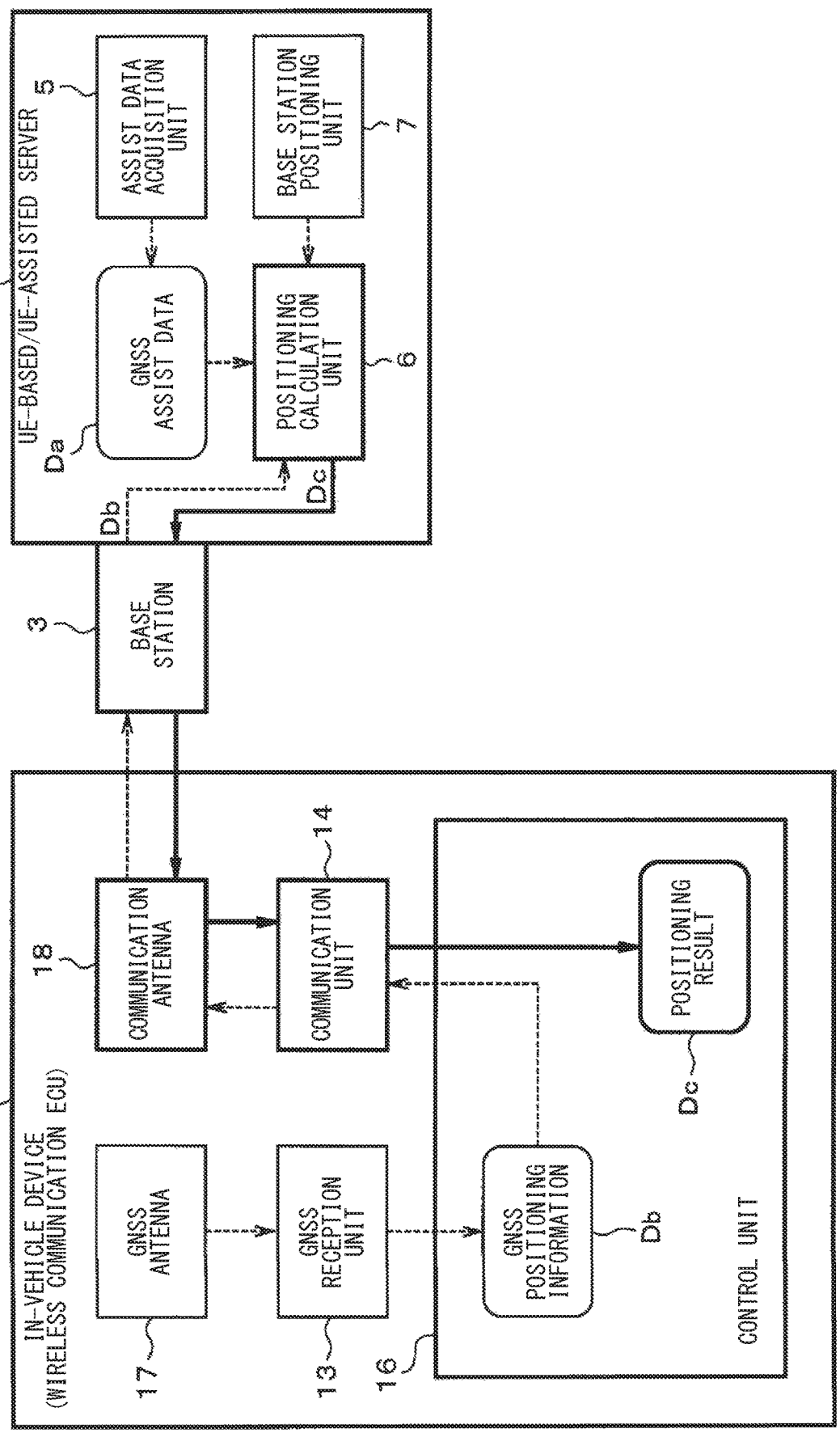
FIG. 4 is a diagram illustrating a UE-assisted operation according to the first embodiment and schematically illustrating a configuration of the in-vehicle device and the positioning server directly related to the UE-assisted operation.

Operations of the above-described configuration will be explained with reference to FIGS. 2 through 9. FIGS. 2 through 4 illustrate the configurations that are illustrated in FIG. 1 and directly concern positioning operations. The other configurations are not illustrated for simplicity.

[1] Standalone Operation

As illustrated in FIG. 2, the standalone operation allows the in-vehicle device 1 alone to perform GNSS positioning without using the cellular communication function. In this case, the positioning calculation unit 20 performs positioning calculation by using GNSS positioning information Db supplied from the GNSS reception unit 13 to acquire the positioning result Dc.

The standalone operation has an advantage of being able to position the vehicle 2 even when the in-vehicle device 1 cannot communicate with the base station 3, namely, the cellular communication is unavailable. The standalone operation requires a relatively long time (such as approximately 30 seconds) to complete the initial positioning. The standalone operation greatly varies the time to determine the availability of positioning or complete the initial positioning due to environmental factors such as a weak electric field and multipath attributed to GNSS.

[2] UE-Based Operation

During the UE-based operation as illustrated in FIG. 3, the in-vehicle device 1 performs GNSS positioning and acquires GNSS assist data Da that is acquired from the positioning server 4 based on the GNSS positioning at the base station 3 by using the cellular communication function. In this case, the positioning calculation unit 20 acquires positioning result Dc by performing the positioning calculation by using the above-described GNSS assist data Da and GNSS positioning information Db supplied from the GNSS reception unit 13.

The UE-based operation has an advantage of requiring a relatively short time (such as approximately two seconds) to complete the initial positioning due to GNSS assist data Da. The UE-based operation has another advantage of having resistance to environmental factors such as a weak electric field and multipath attributed to GNSS compared to the standalone operation. This is because the acquisition of information corresponding to GNSS assist data Da is easily affected by the GNSS radio wave environment.

During the UE-based operation, the in-vehicle device 1 needs to acquire GNSS assist data Da at the initial positioning calculation or at the time of updating GNSS assist data Da. Compared to the UE-assisted operation, the UE-based operation has the advantage of decreasing the number of times to perform cellular communication and reducing the consumption current and communication cost for the in-vehicle device 1. The UE-based operation disables the in-vehicle device 1 from positioning when the cellular communication is unavailable.

[3] UE-Assisted Operation

During the UE-assisted operation as illustrated in FIG. 4, the in-vehicle device 1 performs the GNSS positioning and transmits GNSS positioning information Db acquired by performing the GNSS positioning using the cellular communication function to the positioning server 4 of the base station 3. In this case, the positioning calculation unit 6 of the positioning server 4 performs the positioning calculation by combining GNSS positioning information Db transmitted from the in-vehicle device 1 and GNSS assist data Da. The positioning server 4 performs cellular communication to transmit positioning result Dc acquired from the positioning calculation to the in-vehicle device 1. Even when the in-vehicle device 1 is incapable of GNSS positioning, the positioning calculation unit 6 is capable of performing the positioning calculation by using the positioning information acquired from the base station positioning unit 7 and transmitting positioning result Dc acquired by the positioning calculation to the in-vehicle device 1.

The UE-assisted operation has an advantage of being able to acquire positioning result even on the condition that no signal is received from a GNSS satellite, namely, the GNSS is unavailable. The UE-assisted operation has another advantage of eliminating the need for the in-vehicle device 1 to perform the positioning calculation. The UE-assisted operation has still another advantage of requiring a relatively short time to complete the initial positioning.

In the UE-assisted operation, the in-vehicle device 1 cannot acquire positioning result Dc when cellular communication is unavailable. In the UE-assisted operation, the in-vehicle device 1 needs to always perform cellular communication because positioning result Dc needs to be always acquired. Compared to the UE-based operation, the UE-assisted operation frequently performs cellular communication and increases the consumption current and communication cost in the in-vehicle device 1.

[4] Selection Method for the Positioning Systems

The selection unit 22 selects the positioning system as follows in consideration of the advantage and disadvantage of the positioning systems. The selection unit 22 selects the UE-based system during normal operation, that is, when cellular communication is available. The selection unit 22 selects the standalone system when cellular communication is unavailable. The standalone operation can ensure minimal positioning result even when cellular communication is unavailable. It is possible to overcome the disadvantage of the standalone operation. Namely, it is possible to shorten the initial positioning time and improve the positioning availability under environmental factors such as a weak electric field and multipath attributed to GNSS.

Normally, the selection unit 22 selects the UE-based system or the standalone system. In a case described below, the selection unit 22 changes the positioning system to select the UE-assisted system. Namely, the selection unit 22 changes the positioning system to select the UE-assisted system when a malfunction is detected in the GNSS antenna 17. According to the above-described configuration, the UE-based operation and the standalone operation use the GNSS reception unit 13 including the GNSS antenna 17 of the in-vehicle device 1.

The positioning is disabled when an abnormality such as a malfunction occurs on a circuit and a part configuring the GNSS reception unit 13. The present embodiment changes to the UE-assisted system based on the malfunction information. Specifically, the selection unit 22 selects the UE-assisted system without regard for the other conditions on the selection of the positioning systems when a malfunction on the GNSS reception unit 13 is detected.

When a service or an application using positioning result starts being performed, the selection unit 22 changes the positioning system based on characteristic of the service or the application. The above-described service or application may include a stolen vehicle tracking service, for example. The stolen vehicle tracking service starts in response to acceptance of a request from the owner of a vehicle and allows the in-vehicle device 1 to notify the owner of a current position of the vehicle 2 via an information center, for example.

When the vehicle 2 is stolen, it is highly unlikely to trust the positioning by the UE-based system. This is because there is presently available a jamming tool that generates a jamming signal to GNSS to disable the positioning. When such a tool is attached to the stolen vehicle 2, the positioning result is incapable of being acquired when the UE-based system is selected and stolen vehicle tracking service does not function effectively.

According to the present embodiment, the selection unit 22 changes the positioning system to select the UE-assisted system when the stolen vehicle tracking service starts operating. In this case, the selection unit 22 selects the UE-assisted system in conjunction with the stolen vehicle tracking service without regard for the other conditions on the selection of the positioning systems.

Moreover, the selection unit 22 verifies the validity of a positioning result in the current positioning system based on vehicle travel information. When the positioning result is determined to be invalid, the selection unit 22 changes the positioning system to select the UE-assisted system. A "positioning result being valid" signifies that the accuracy of the positioning result reaches a target level. A "positioning result being invalid" signifies that the accuracy of the positioning result does not reach the target level. In this case, "verifying the validity of a positioning result" corresponds to "determining the positioning accuracy of GNSS."

Specifically, the validity of positioning result is conducted as follows. As above, the vehicle travel information is acquired from the sensors. The use of this information can estimate the travel amount of the vehicle 2 in a predetermined elapsed time. The travel amount of the vehicle 2 in the predetermined elapsed time is calculated by the positioning results at the beginning of the elapsed time and at the end of the elapsed time. There may be a large difference between the estimated travel amount and the calculated travel amount. In such a case, the accuracy of the GNSS positioning result is highly unlikely to reach the target level.

In consideration of this point, in the present embodiment, the selection unit 22 estimates the travel amount based on the vehicle travel information. In this case, the selection unit 22 estimates the travel amount of the vehicle 2 in the predetermined elapsed time by accumulating the vehicle travel information, specifically, successively integrating the information about the vehicle speed and the orientation. The selection unit 22 calculates the travel amount of the vehicle 2 in the elapsed time based on a difference between two positions corresponding to GNSS positioning result at the beginning of the elapsed time and at the end of the elapsed time. There may be a difference between the travel amount estimated based on the vehicle travel information and the travel amount calculated based on the positioning result. When the difference exceeds a predetermined determination threshold value, the selection unit 22 determines that a GNSS positioning result is invalid.

[5] Processing Details in the in-Vehicle Device 1

Figure 5:
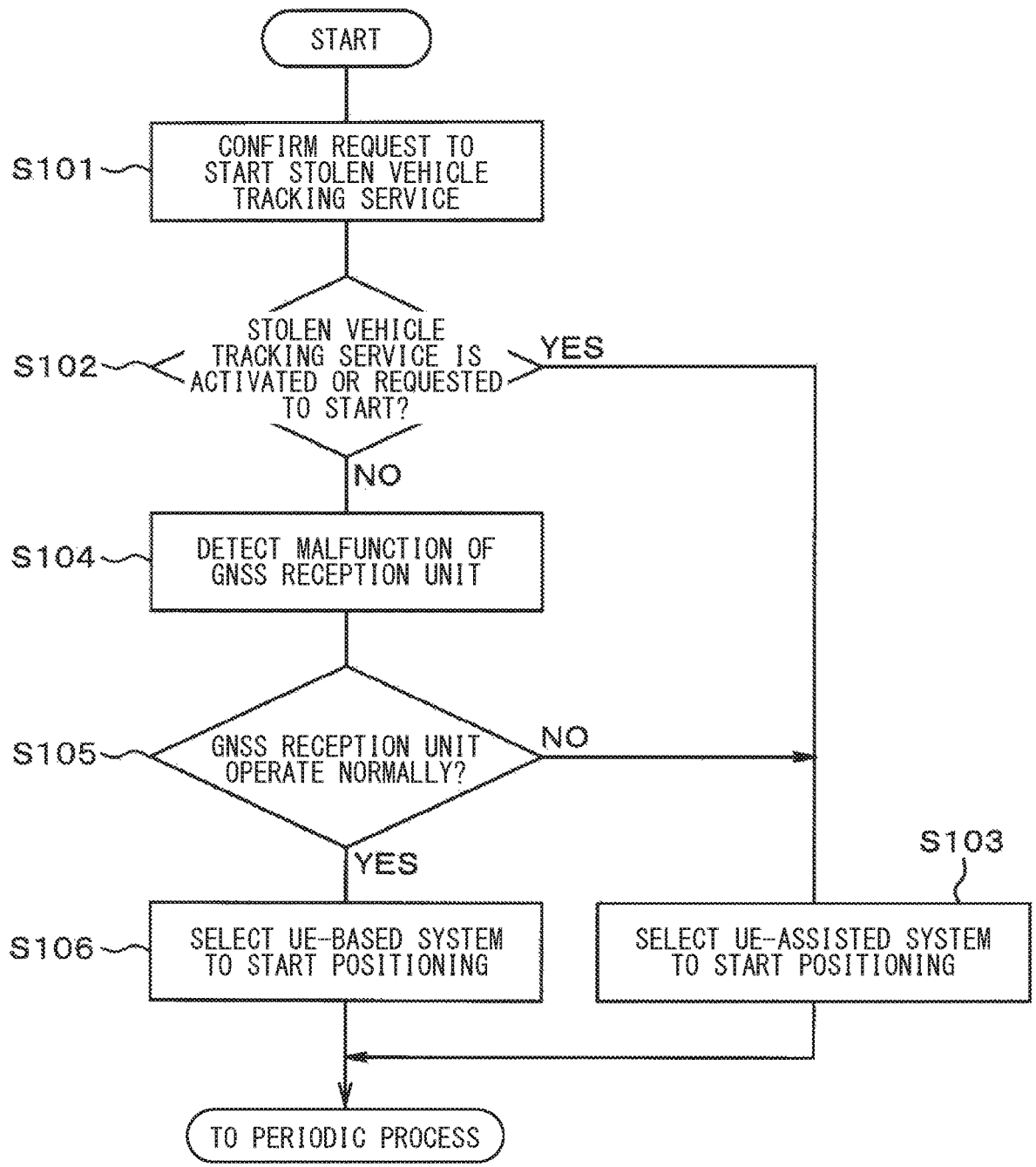
FIG. 5 is a diagram schematically illustrating a process performed at the beginning of initial positioning according to the first embodiment.

At the beginning of the initial positioning, the in-vehicle device 1 performs the process illustrated in FIG. 5. The beginning of the initial positioning corresponds to the time when the in-vehicle device 1 is powered on to start the system or the time when turning on the engine resumes the active mode from the standby mode that is activated by turning off the engine of the vehicle 2, for example. In S101 as illustrated in FIG. 5, the process determines whether there is a request to start the stolen vehicle tracking service. In S102, the process determines whether the stolen vehicle tracking service is active and there is a request to start the stolen vehicle tracking service.

The stolen vehicle tracking service may be active or there may be a request to start the stolen vehicle tracking service. In this case, S102 results in YES and proceeds to S103. In S103, the process selects the UE-assisted system to start positioning. The stolen vehicle tracking service may be inactive and there may be no request to start the stolen vehicle tracking service. In this case, S102 results in NO and proceeds to S104.

In S104, the process detects a malfunction, that is, an abnormality on the GNSS reception unit 13. In S105, the process determines whether the GNSS reception unit 13 is normal. When the GNSS reception unit 13 is normal, S105 results in YES and the process proceeds to S106. In S106, the UE-based system is selected to start positioning. When the GNSS reception unit 13 is abnormal, S105 results in NO and the process proceeds to S103. The process in FIG. 5 terminates after S103 or S106, and proceeds to a periodic process described below.

Figure 6:
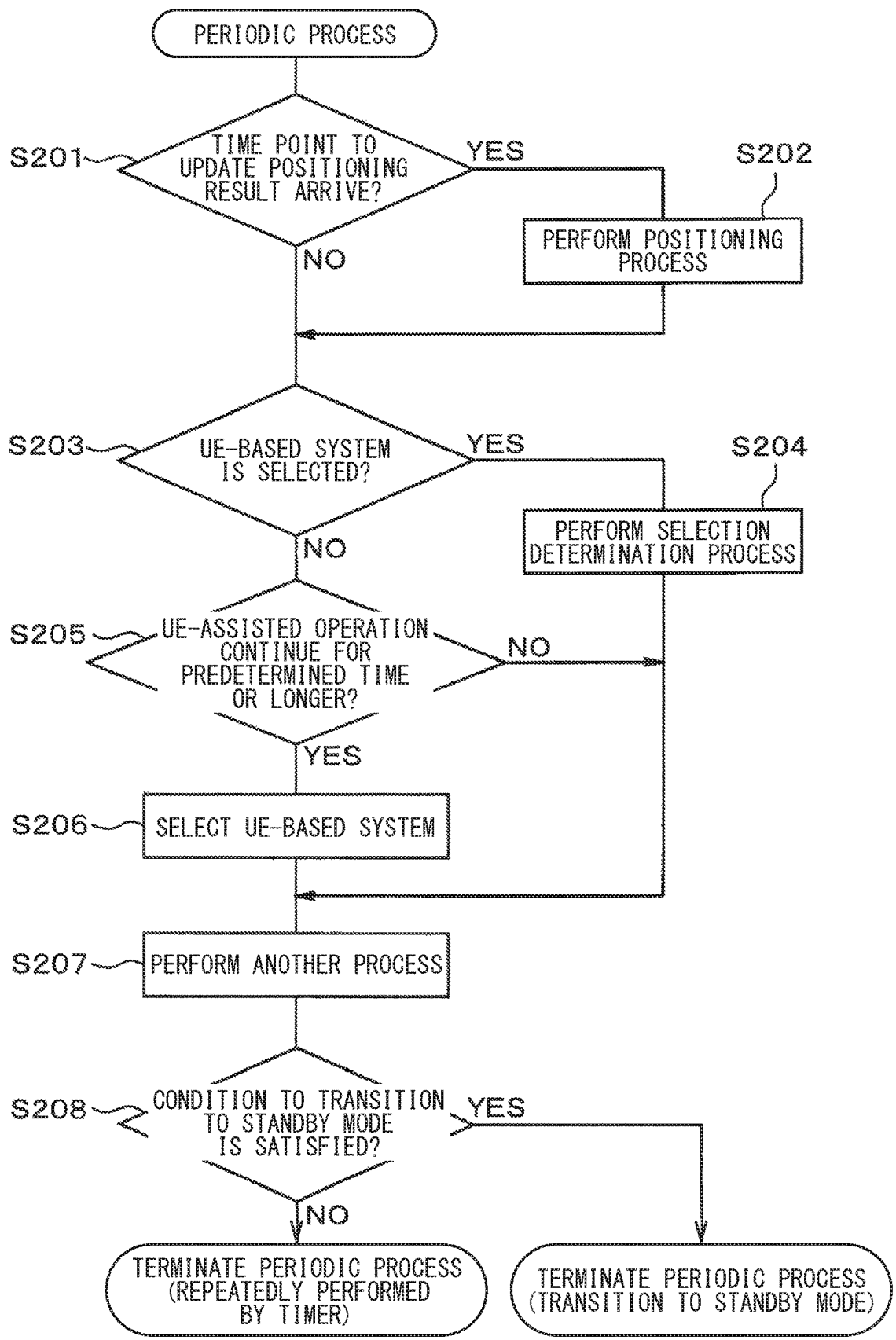
FIG. 6 is a diagram schematically illustrating a periodic process according to the first embodiment.

The periodic process is performed periodically and repeatedly and has the contents as illustrated in FIG. 6. In S201 of FIG. 6, the process determines whether the time point to perform a positioning process, namely, the time point to update a positioning result arrives. The positioning result update time point corresponds to a cycle of transmitting signals from a GNSS satellite. A cycle of repeating the periodic process is shorter than the cycle of transmitting signals from the GNSS satellite.

When the positioning result update time point is reached, S201 results in YES and the process proceeds to S202. When the positioning result update time point is not reached, S201 results in NO and the process proceeds to S203. In S202, the positioning process is performed. The positioning process will be described in detail later. After S202, the process proceeds to S203. In S203, the process determines whether the UE-based system is selected as a positioning system.

When the UE-based system is selected, S203 results in YES and the process proceeds to S204. In S204, a selection determination process is performed. The selection determination process will be described in detail later. After S204, the process proceeds to S207. When the UE-based system is not selected, S203 results in NO and the process proceeds to S205.

In S205, the process determines whether the UE-assisted system is selected, namely, the UE-assisted operation continues for a predetermined time or longer. When the UE-assisted system does not continue in for a predetermined time or longer, S205 results in NO and the process proceeds to S207.

When the UE-assisted system continues for the predetermined time or longer, S205 results in YES and the process proceeds to S206. In S206, the process changes the positioning system to select the UE-based system. After S206, the process proceeds to S207.

In S207, the in-vehicle device 1 performs processes other than those related to the positioning. In S208, the process determines whether the system satisfies a condition to transition to the standby mode. In this case, for example, turning off the engine satisfies the condition to transition to the standby mode.

When the transition condition to the standby mode is satisfied, S208 results in YES and the periodic process terminates. In this case, the system transitions to the standby mode upon the termination of the periodic process. When the system transitions to the standby mode while the UE-assisted system is selected, the present embodiment can resume the state of selecting the UE-based system as described below.

The process illustrated in FIG. 5 is performed again when the active mode is resumed from the standby mode. The processes in FIG. 5 are performed to reselect the positioning system depending on the situation in which the active mode is resumed. When S102 and S105 result in NO, the positioning system changes to the state in which the UE-based system is selected.

When the transition condition for the standby mode is not satisfied, S208 results in NO and the periodic process terminates. In this case, the periodic process restarts after a lapse of predetermined time measured by a timer, for example. Namely, the periodic process is performed repeatedly. When the periodic process is performed repeatedly while the UE-assisted system is selected, the process in S205 and S206 resumes the state of selecting the UE-based system.

Figure 7:
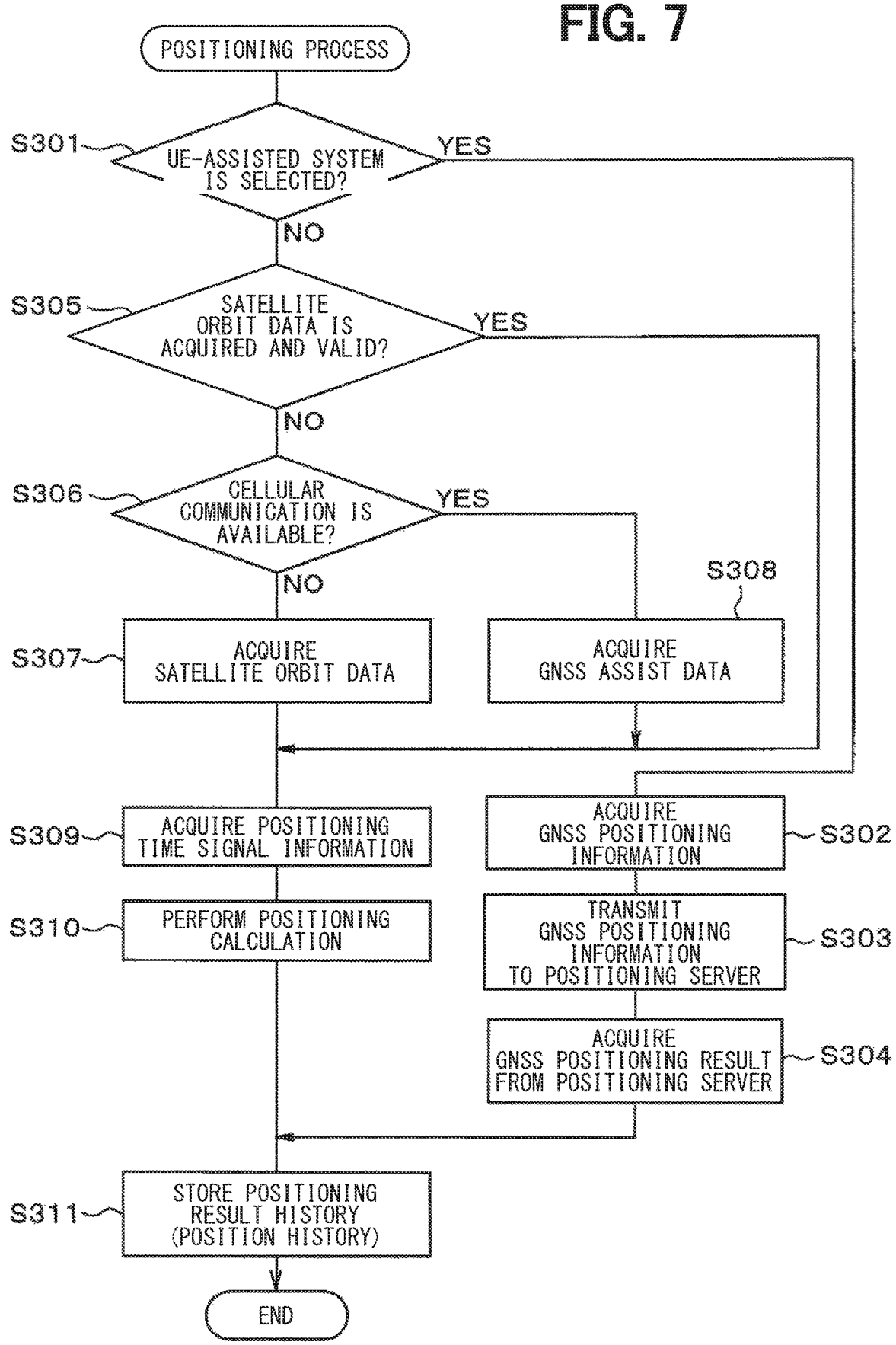
FIG. 7 is a diagram schematically illustrating a positioning process according to the first embodiment.

FIG. 7 illustrates processing details of the above-described positioning process. In S301 in FIG. 7, the process determines whether the UE-assisted system is selected as a positioning system. When the UE-assisted system is selected, S301 results in YES and the process proceeds to S302. In S302, GNSS positioning information Db is acquired based on a signal received by the GNSS reception unit 13. In S303, GNSS positioning information Db acquired in S302 is transmitted to the positioning server 4. In S304, the process acquires GNSS positioning result Dc transmitted from the positioning server 4.

When the UE-assisted system is not selected, S301 results in NO and the process proceeds to S305. In S305, the process determines whether satellite orbit data is acquired. A time limit is placed on the satellite orbit data because the satellite location varies with a lapse of time. In S305, the process also determines whether the acquired satellite orbit data is valid.

When the valid satellite orbit data is acquired, S305 results in YES and the process proceeds to S309. When the satellite orbit data is not acquired or the acquired satellite orbit data is invalid, S305 results in NO and the process proceeds to S306.

In S306, the process determines whether the cellular communication is available. When the cellular communication is unavailable, S306 results in NO and the process proceeds to S307. Though not illustrated, the standalone system is automatically selected when the cellular communication is unavailable and S306 results in NO. During the standalone operation, the in-vehicle device 1 needs to acquire satellite orbit data. Therefore, in S307, the process acquires satellite orbit data based on a signal received by the GNSS reception unit 13.

When the cellular communication is available, S306 results in YES and the process proceeds to S306. Though not illustrated, the UE-based system is automatically selected when the cellular communication is available and S306 results in YES. During the UE-based operation, the satellite orbit data is included in GNSS assist data Da transmitted from the positioning server 4. In S308, the cellular communication is performed to communicate with the positioning server 4 to acquire GNSS assist data Da.

After S307 or S308, the process proceeds to S309. In S309, the process acquires the positioning time signal information based on a signal received by the GNSS reception unit 13. In S310, the positioning calculation unit 20 performs the positioning calculation using the satellite orbit data and the positioning time signal information to acquire GNSS positioning result Dc.

After S310 or S304, the process proceeds to S311. In S311, the process stores a history of GNSS positioning result Dc, namely, a position history of the vehicle 2. The history of positioning result is used for the selection determination process to be described. After S311, the positioning process terminates.

Figure 8:
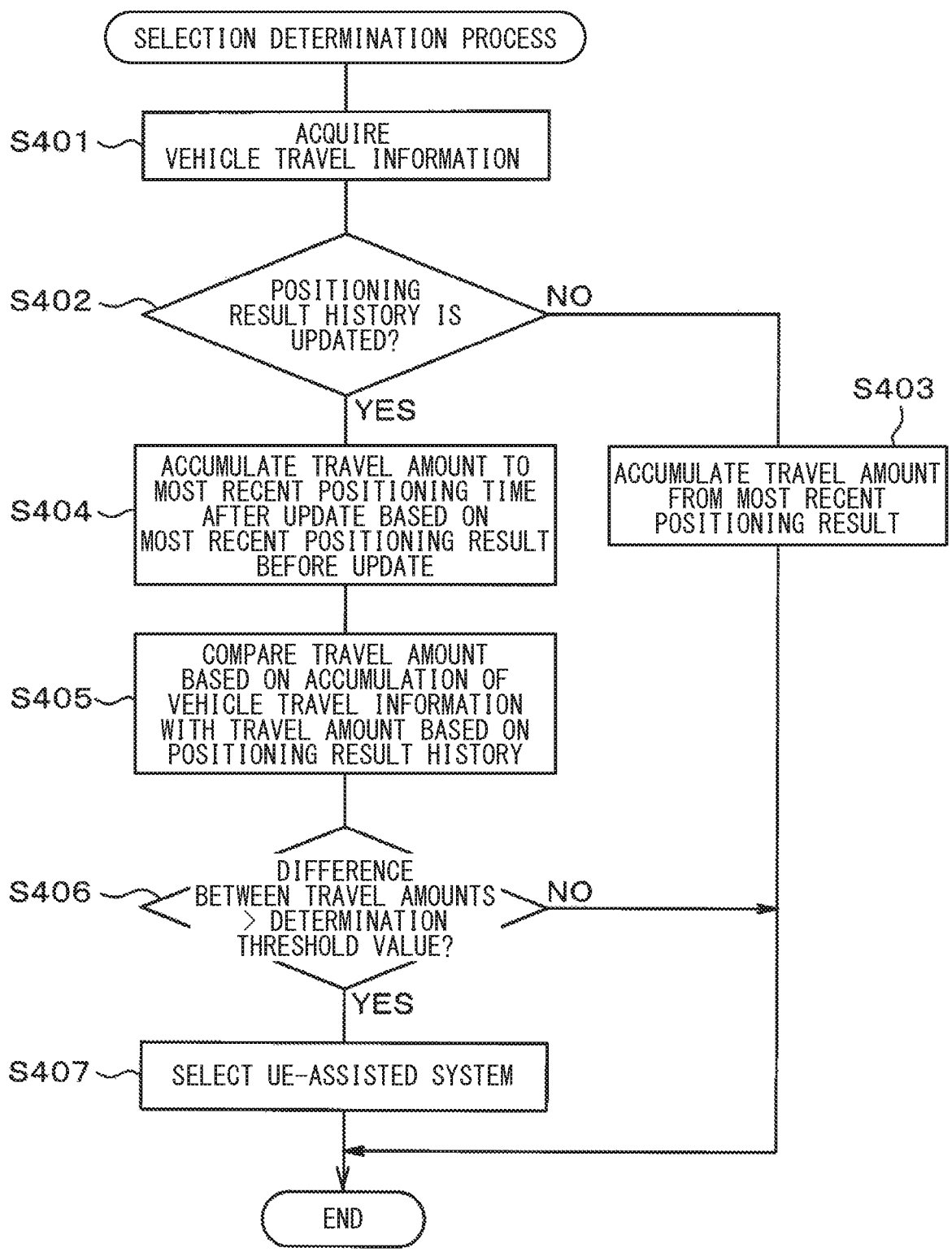
FIG. 8 is a diagram schematically illustrating a selection determination process according to the first embodiment.

FIG. 8 illustrates processing details of the above-described selection determination process. In S401 of FIG. 8, the communication network 8 is used for communication with the in-vehicle devices 9 through 12 to acquire the vehicle travel information such as vehicle speed, acceleration, angle, mileage, and orientation. In S402, the process determines whether the positioning result history, namely, the position history is updated.

When the positioning result history is not updated, S402 results in NO and the process proceeds to S403. In S403, the process accumulates a travel amount from the position of the vehicle 2 indicated by the most recent positioning result. The travel amount is accumulated from vehicle speed, orientation, the most recent positioning time, or the time elapsed from the previous accumulation. After S403, the selection determination process terminates. In this case, the UE-based operation continues in the next positioning.

When the positioning result history is updated, S402 results in YES and the process proceeds to S404. In S404, the process calculates a travel amount from the position of the vehicle 2 indicated by the most recent positioning result before the update to the most recent positioning time after the update. The accumulation of travel amounts mainly uses vehicle speed, orientation, or the time elapsed from the previous accumulation to the most recent positioning time.

In S405, the process compares the travel amount calculated in S404 from the accumulation of the vehicle travel information with the travel amount calculated from the positioning result history, namely, the position history. In S406, the process determines whether a difference between the travel amounts, that is, the error exceeds a determination threshold value. When the difference is smaller than or equal to the determination threshold value, S406 results in NO and the selection determination process terminates. In this case, the UE-based operation continues in the next positioning.

When the difference is greater than the determination threshold value, S406 results in YES and the process proceeds to S407. In S407, the UE-assisted system is selected as a positioning system. After S407, the selection determination process terminates. In this case, the UE-assisted operation is performed for the next positioning.

Figure 9:
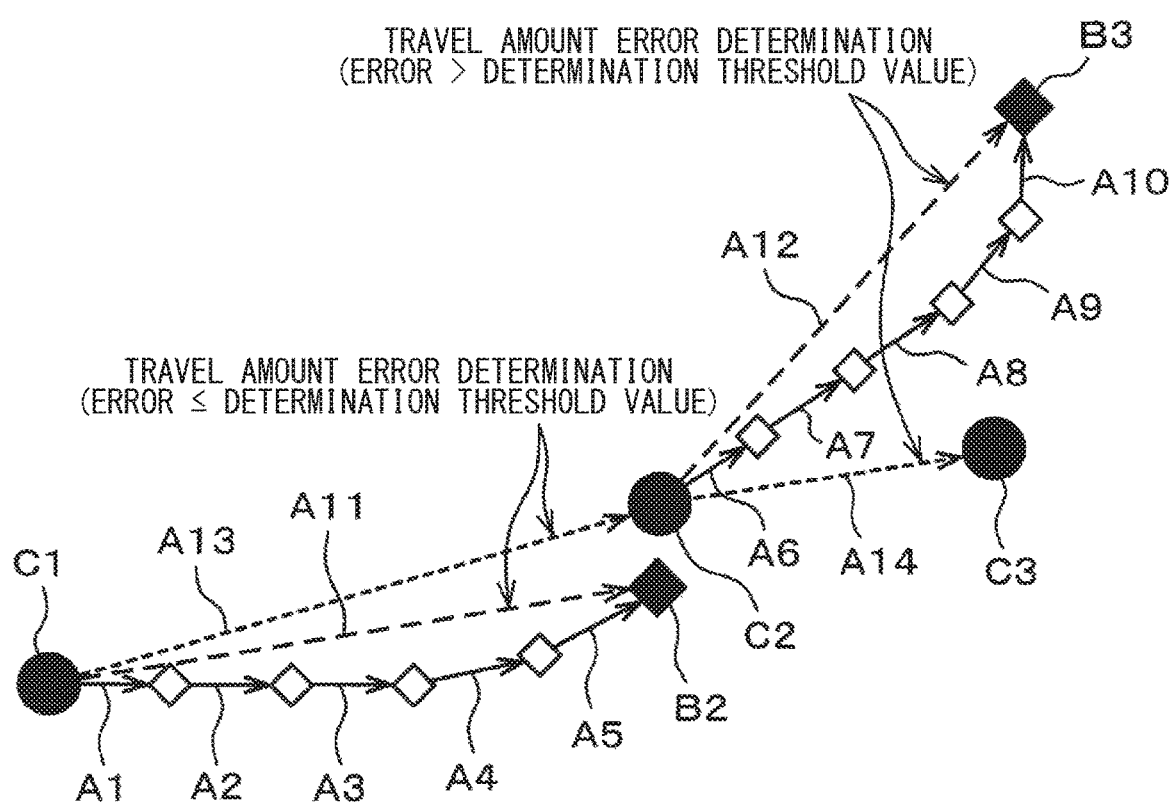
FIG. 9 is a diagram illustrating a specific example of determination based on a travel amount error according to the first embodiment.

With reference to FIG. 9, the description below explains a specific example of the determination based on a travel amount error in the selection determination process. It is supposed that the cycle of updating a positioning result is five times the cycle of repeating the periodic process, namely, the cycle of updating the vehicle travel information. In FIG. 9, a black circle represents the position of the vehicle 2 indicated by the positioning result. A white square represents the position of the vehicle 2 estimated from the accumulation of the vehicle travel information when a positioning result is not updated. A black square represents the position of the vehicle 2 estimated from the accumulation of the vehicle travel information when a positioning result is updated.

In FIG. 9, solid-line arrows A1 through A10 represent travel amounts of the vehicle 2 based on the vehicle travel information. Arrows A11 and A12 illustrated in long-dashed lines represent travel amounts of the vehicle 2 based on the accumulation of the vehicle travel information. Arrows A13 and A14 illustrated in short-dashed lines represent travel amounts of the vehicle 2 based on the positioning result.

The accumulation of travel amounts in S403 corresponds to successively calculating arrows A1 through A5 or arrows A6 through A10. The travel amounts are accumulated from the time to update the previous positioning result to the time to update the current positioning result, thus estimating position B2 and B3 illustrated in black squares based on the accumulation of the vehicle travel information. The accumulation of travel amounts in S404 corresponds to calculating arrows A11 and A12.

When the most recent positioning result before the update indicates position C1, for example, S404 calculates arrow A11 connecting position C1 and B2. When the most recent positioning result before the update indicates position C2, S404 calculates arrow A12 connecting position C2 and B3.

Arrows A13 and A14 correspond to travel amounts calculated from the positioning result history used in S405. When the previously updated positioning result indicates position C1, for example, S405 calculates arrow A13 connecting position C1 and position C2 indicated by the presently updated positioning result. When the previously updated positioning result indicates position C2, S405 calculates arrow A14 connecting position C2 and position C3 indicated by the presently updated positioning result.

The comparison of the travel amounts in S405 corresponds to the comparison between arrows A11 and A13 and the comparison between arrows A12 and A14. Arrow A11 is considered to be almost as long as arrow A13. The difference is considered to be smaller than the determination threshold value. Therefore, the GNSS positioning result is assumed to be valid at the time point to acquire position C2 based on the updated positioning result. The UE-based operation continues in the next positioning.

Meanwhile, arrows A12 and A13 greatly differ from each other in the length. The difference is considered to exceed the determination threshold value. Therefore, the GNSS positioning result is assumed to be invalid at the time point to acquire position C3 based on the updated positioning result. The UE-assisted operation is used for the next positioning.

The present embodiment determines whether the GNSS positioning result is valid, based on the travel amount (such as arrow A11 or A13) from the position (such as position C1) indicated by the most recent positioning result. This determination is also able to being performed based on a difference between position C2 or C3 indicated by the updated positioning result and position B2 or B3 based on the accumulation of the vehicle travel information, namely, the distance between the positions. A difference between travel amounts is favorably compared by using latitudinal and longitudinal vectors but may be compared by using absolute values of the travel amounts for a simplified determination.

As described above, the in-vehicle device 1 according to the present embodiment includes three positioning systems such as the standalone system, the UE-based system, and the UE-assisted system and can selectively perform the positioning operation corresponding to each system. To be capable of the selection, the in-vehicle device 1 includes the information acquisition unit 21 to acquire the vehicle travel information from the other in-vehicle devices 9 through 12 and the selection unit 22 to select one of the three positioning systems. In the above-described configuration, the accuracy of positioning result from the standalone system or the UE-based system is easily affected by an external influence such as the location of GNSS satellites or multipath due to buildings and other vehicles exiting around the vehicle 2 as a subject vehicle. Meanwhile, the vehicle travel information acquired from the sensors mounted on the vehicle 2 is information acquired in a closed environment of the vehicle 2, thus the vehicle travel information is hardly affected by the external influence and capable of ensuring high stability. As described above, with the vehicle travel information can estimate information about position of the vehicle 2 such as the travel amount or the travel direction of the vehicle 2.

When the UE-based system is selected according to the present embodiment, the selection unit 22 verifies the validity, that is, the accuracy of a positioning result based on the vehicle travel information. The selection unit 22 changes the positioning system to select the UE-assisted system when determining that the positioning result is invalid, namely, the accuracy of the positioning result falls short of a required level. The selection unit 22 selects the positioning system to always acquire a highly accurate positioning result. The configuration according to the present embodiment selects an appropriate positioning system with an emphasis on the improvement of the positioning result accuracy. It is possible to select an appropriate positioning system used for positioning of the vehicle 2.

The in-vehicle device 1 according to the present embodiment includes the malfunction detection unit 15 that detects a malfunction of the GNSS reception unit 13. According to the above-described configuration, the UE-based operation and the standalone operation use the GNSS reception unit 13 including the GNSS antenna 17 for the in-vehicle device 1. Therefore, the positioning is unavailable when an abnormality such as a malfunction of circuit or part configuring the GNSS reception unit 13 occurs. According to the present embodiment, the selection unit 22 selects the UE-assisted system without regard for the other conditions on the selection of the positioning systems when the malfunction detection unit 15 detects a malfunction of the GNSS reception unit 13. It is possible to avoid a situation in which the positioning result cannot be acquired due to a malfunction of the GNSS reception unit 13.

When a service or an application using positioning result starts being available, the selection unit 22 changes the positioning system according to characteristics of the service or the application. Specifically, the selection unit 22 changes the positioning system to select the UE-assisted system when the stolen vehicle tracking service starts. The reason follows.

When the above-described jamming tool is attached to the stolen vehicle 2, the positioning result cannot be acquired in the UE-based system and the stolen vehicle tracking service does not function effectively. To solve this problem, the selection unit 22 selects the UE-assisted system in conjunction with the stolen vehicle tracking service without regard for the other conditions on the selection of the positioning systems. It is possible to acquire positioning result from the base station even when the jamming tool is attached to the stolen vehicle 2. The stolen vehicle tracking service can function effectively.

Second Embodiment

Figure 10:
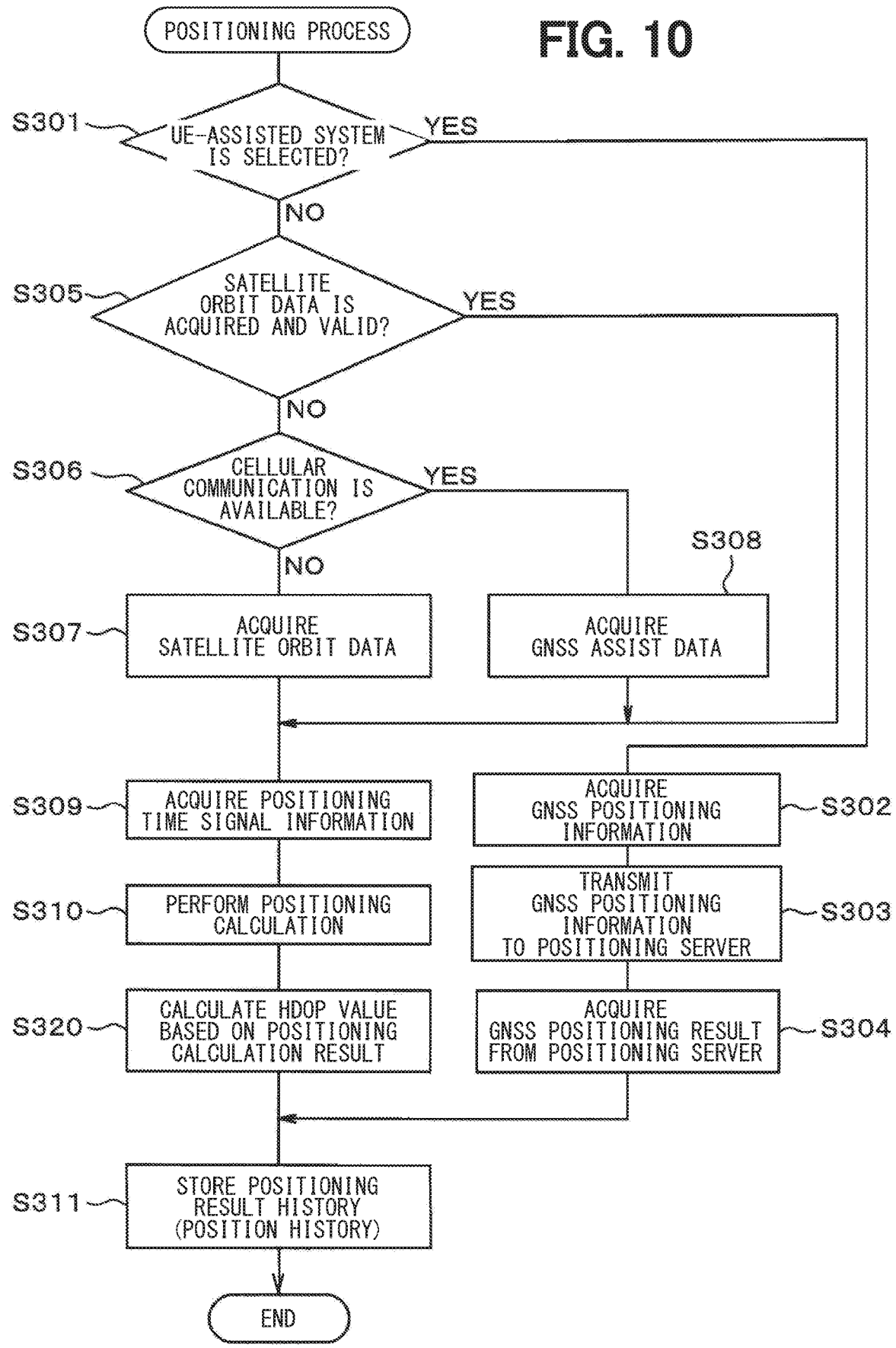
FIG. 10 is a diagram schematically illustrating a positioning process according to a second embodiment.

The second embodiment will be described with reference to FIGS. 10 and 11.

The second embodiment changes the first embodiment in terms of the technique of selecting the positioning systems. In this case, the selection unit 22 aims at inhibiting a decrease in the positioning accuracy and dynamically selects the positioning system based on the GNSS positioning information.

Regardless of existence of many visible satellites, the theoretical positioning accuracy resulting from the location of visible satellites decreases in an environment where the location of visible satellites is limited to a part of the celestial sphere. Such an environment may be exemplified by an area with high-rise buildings which causes the vision from the current position of the vehicle 2 to be poor.

There is an index for the theoretical positioning accuracy, namely, an index to determine a degradation level of the positioning accuracy based on the GNSS satellite location. This index is called a DOP value. The DOP value includes an HDOP value indicative of a degradation level of the positioning accuracy in the horizontal direction and a VDOP value indicative of a degradation level of the positioning accuracy in the vertical direction. The HDOP value is more important than the VDOP in terms of projection position on a map plane.

When the UE-based system is selected according to the present embodiment, the DOP value acquired from a positioning result, specifically, the HDOP value may exceed a predetermined threshold value. In this case, the selection unit 22 assumes the GNSS environment to be degraded and changes the positioning system to select the UE-assisted system. Both the HDOP value and the VDOP value may be used to determine the positioning system change.

The description below explains processing details in the in-vehicle device 1 according to the present embodiment. The present embodiment differs from the first embodiment in the positioning process and the selection determination process. FIG. 10 illustrates the processing details of the positioning process according to the present embodiment. As illustrated in FIG. 10, the positioning process according to the present embodiment includes S320 that is an addition to the processes included in the positioning process according to the first embodiment. After S310, the process proceeds to S320. In S320, the process calculates an HDOP value based on the result of the positioning calculation performed in S310. After S320, the process proceeds to S311.

Figure 11:
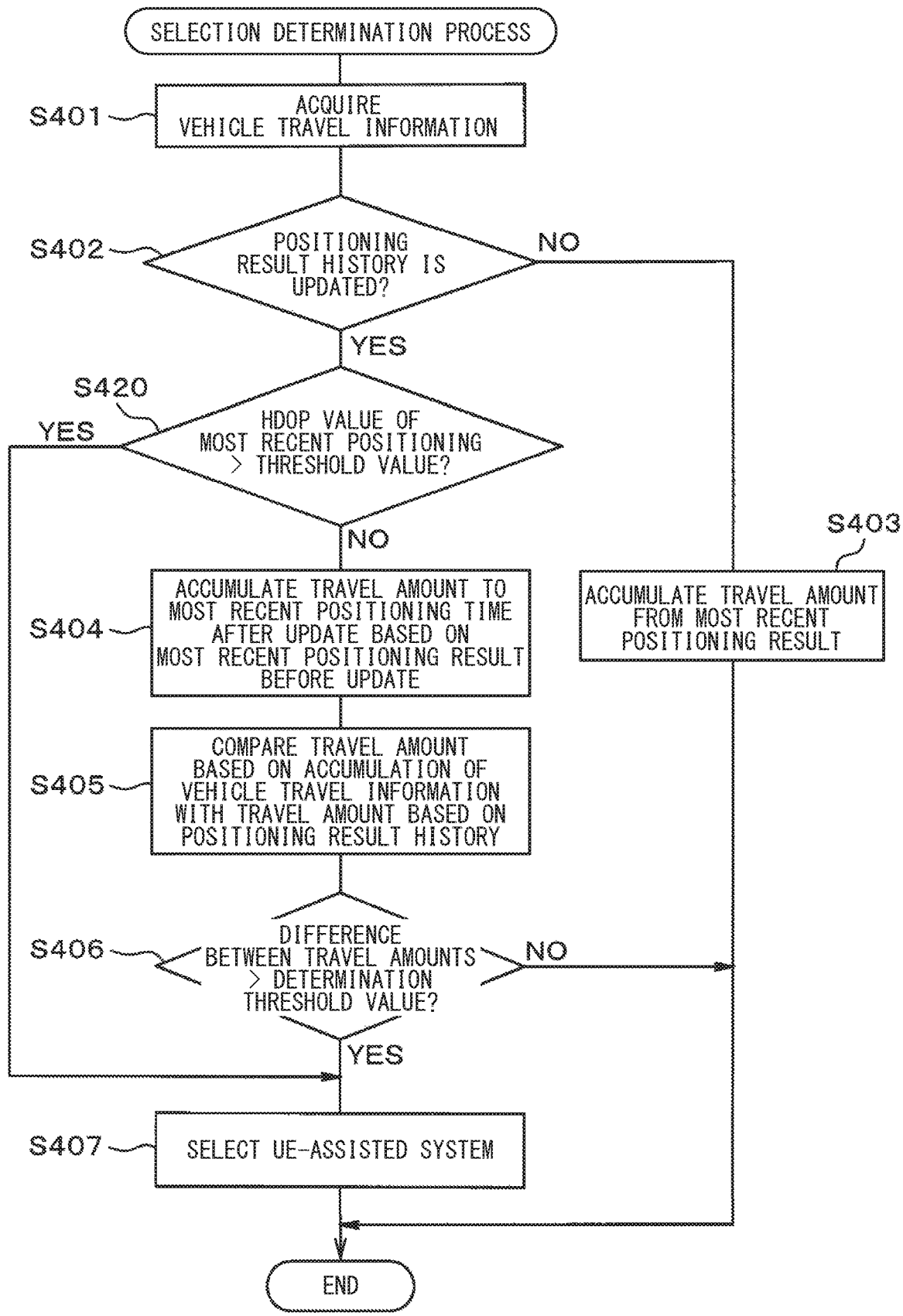
FIG. 11 is a diagram schematically illustrating a selection determination process according to the second embodiment.

FIG. 11 illustrates the specific contents of the selection determination process according to the present embodiment.

As illustrated in FIG. 11, the selection determination process according to the present embodiment includes S420 that is an addition to the processes included in the selection determination process according to the first embodiment. After S402, the process proceeds to S420.

In S420, the process determines whether the HDOP value of the most recent positioning exceeds a predetermined threshold value. When the HDOP value exceeds the threshold value, S420 results in YES and the process proceeds to S407. When the HDOP value is equal to or smaller than the threshold value, S420 results in NO and the process proceeds to S404.

As described above, the present embodiment uses the index concerning the GNSS positioning accuracy to change the UE-based system to the UE-assisted system. Specifically, the selection unit 22 changes the positioning system to select the UE-assisted system when the HDOP value exceeds the threshold value while the UE-based system is selected. Even when the GNSS environment is considered to degrade, it is possible to expect an increase in the positioning accuracy through the use of base station positioning, namely, alternative positioning using a distance from the base station of the cellular communication network.

The description below explains an advantage of the present embodiment over the technique that changes from the UE-based system to the UE-assisted system based on the number of visible satellites. The technique that changes from the UE-based system to the UE-assisted system based on the number of visible satellites is hereinafter denoted as a comparative example. The comparative example using the determination based on the number of visible satellites is likely to cause an issue described below.

There may be an environment in which a building hinders GNSS electric waves and the sky is visible in a limited orientation. In such a case, the positioning accuracy may degrade due to a deflection in the location of visible satellites even when the number of visible satellites satisfies the requirement or more. The comparative example is considered to continue the positioning in the UE-based system incapable of improving the accuracy under the environment in which the sky is partially visible even though the UE-assisted system is more likely to improve the positioning accuracy. Meanwhile, the present embodiment changes from the UE-based system to the UE-assisted system according to the determination based on the HDOP value and improves the positioning accuracy even under the environment in which the sky is partially visible and the satellite location is improper despite the existence of many visible satellites.

The HDOP value is based on the satellite location. It is hardly possible to improve an improper HDOP value that is larger than the threshold value. When the HDOP value is larger than the threshold value, it is possible to determine that the positioning accuracy degrades, namely, the positioning data is less reliable without using the determination based on a travel amount error.

The present embodiment performs the determination based on the HDOP value (S420) when the positioning result history is updated, namely, S402 results in YES. When the HDOP value is larger than the threshold value as a result of the determination, the UE-assisted system is selected without the use of the determination based on a travel amount error (S405 and S406). It is possible to reduce processing loads required to change the UE-based system to the UE-assisted system under the environment of the partially visible sky, compared to the case of performing the determination based on the HDOP value after the determination based on the travel amount error.

Third Embodiment

Figure 12:
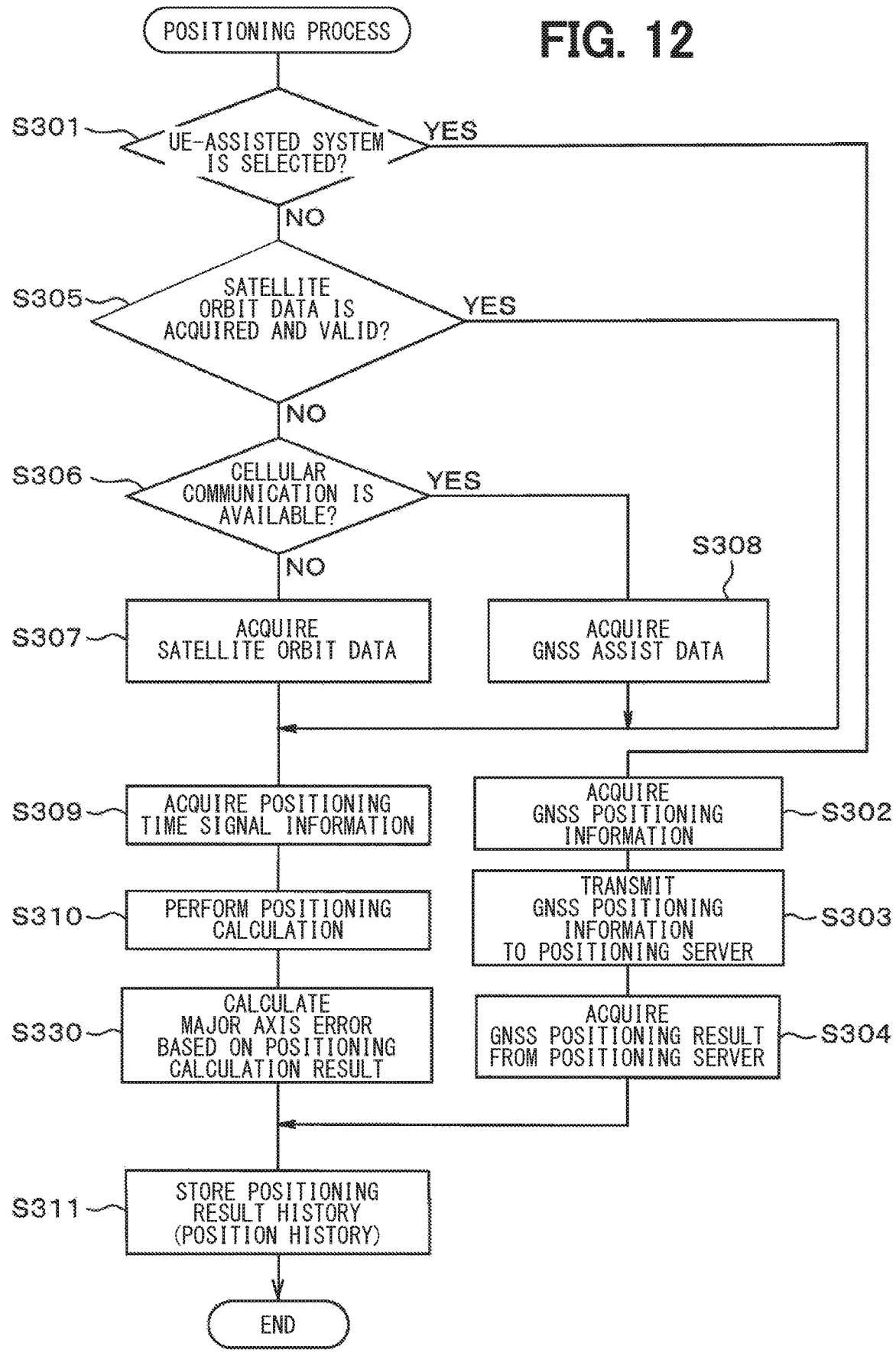
FIG. 12 is a diagram schematically illustrating a positioning process according to a third embodiment.

The third embodiment will be described with reference to FIGS. 12 and 13.

The present embodiment changes the technique of selecting the positioning system according to the first embodiment. The selection unit 22 aims at inhibiting the positioning accuracy from degrading and dynamically selects the positioning system based on the GNSS positioning information.

The HDOP value used in the second embodiment takes into account the satellite location but does not concern the degradation of the positioning accuracy due to the reception of a reflected wave under a multipath environment in which a GNSS radio wave reflects off buildings and reaches a receiver via a plurality of paths. To solve this problem, the present embodiment changes the positioning system as follows by using a major axis error as an index that takes into account the influence of the reception of reflected waves.

GNSS positioning errors form an elliptical distribution that provides information such as errors in the major axis direction, errors in the minor axis direction, and the inclination of an ellipse. To simplify processes, the error distribution is assumed to be a circular error circumscribing the elliptic error instead of the elliptic. A major axis error represents the standard deviation for the radius. The UE-assisted system is selected when the major axis error, namely, the standard deviation of the radius exceeds a predetermined threshold value.

While the UE-based system is selected, the selection unit 22 according to the present embodiment changes the positioning system to select the UE-assisted system when the major axis error exceeds a predetermined threshold value. As described above, the major axis error represents the standard deviation of the dispersion in the major axis direction in an elliptic error distribution estimated from positioning result.

The description below explains processing details in the in-vehicle device 1 according to the present embodiment. The present embodiment differs from the first embodiment in the contents of the positioning process and the selection determination process. FIG. 12 illustrates the processing details of the positioning process according to the present embodiment. As illustrated in FIG. 12, the positioning process according to the present embodiment includes S330 that is an addition to the processes included in the positioning process according to the first embodiment. After S310, the process proceeds to S330. In S330, a major axis error is calculated based on a result of the positioning calculation performed in S310. After S330, the process proceeds to S311.

Figure 13:
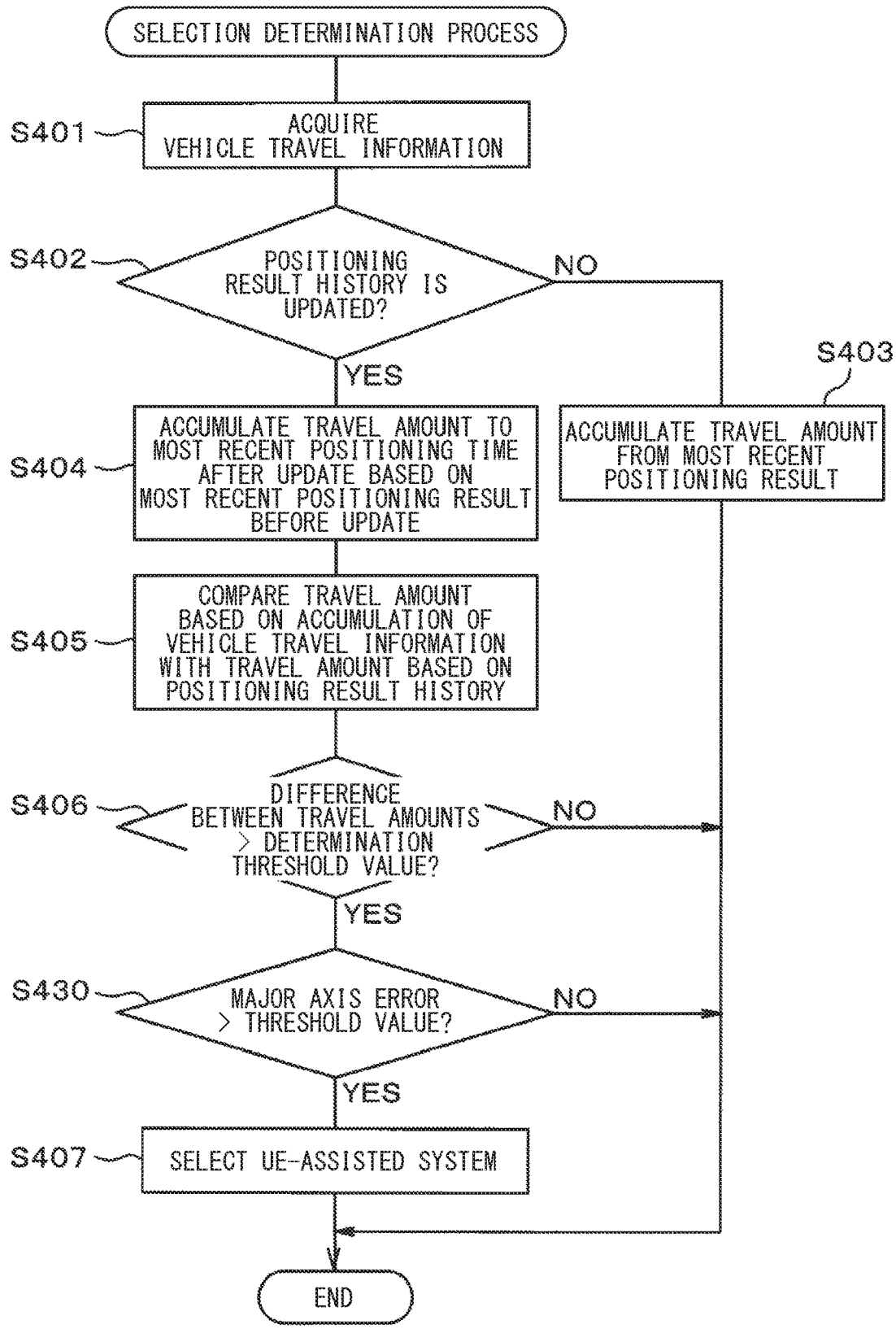
FIG. 13 is a diagram schematically illustrating a selection determination process according to the third embodiment.

FIG. 13 illustrates the contents of the selection determination process according to the present embodiment. As illustrated in FIG. 13, the selection determination process according to the present embodiment includes S430 that is an addition to the processes included in the selection determination process according to the first embodiment. When a difference between the travel amount based on the vehicle travel information accumulation and the travel amount based on the positioning result history exceeds the determination threshold value, S406 results in YES and the process proceeds to S430.

In S430, the process determines whether the major axis error for the most recent positioning exceeds a predetermined threshold value. When the major axis error is larger than the threshold value, S430 results in YES and the process proceeds to S407. When the major axis error is smaller than or equal to the threshold value, S430 results in NO and the selection determination process terminates.

As described above, the present embodiment uses the index concerning the GNSS positioning accuracy to change the UE-based system to the UE-assisted system. While the UE-based system is selected, the selection unit 22 changes the positioning system to select the UE-assisted system when the major axis error acquired from a positioning result exceeds the threshold value.

The present embodiment can provide an effect similar to the second embodiment. Even when the GNSS environment is considered to degrade, it is possible to expect an increase in the positioning accuracy through the use of base station positioning, namely, alternative positioning using a distance from the base station of the cellular communication network. The present embodiment has an advantage similar to the second embodiment over the comparative example.

The major axis error is affected by the multipath due to the reflection from buildings and the situation varies from moment to moment. Therefore, it is preferable to perform the determination based on a travel amount error, namely, the determination in S405 and S406 even when the major axis error indicates an unfavorable value, namely, the major axis error exceeds the threshold value. In the present embodiment, when it is determined that the positioning data is less reliable as a result of the determination based on the travel amount error, S406 results in YES and the process performs the determination based on the major axis error (S430).

The process is performed in this order also for the following reason. The determination based on the travel amount error makes it difficult to determine which of the previous positioning result, the present positioning result, and the vehicle travel information is questionable. The present embodiment performs the determination based on the major axis error to determine whether the determination based on the travel amount error is definitely correct.

Besides the determination based on the travel amount error, it is possible to determine that an issue exists not in the vehicle travel information but in the positioning result, when the determination based on the major axis error ascertains the positioning result to be less reliable, namely, S406 and S430 result in YES. In this case, the present positioning result is less reliable and it is hard to consider that the GNSS environment is changed for the better. Then, the positioning system changes to the UE-assisted system to improve positioning accuracy by using alternative positioning.

There may be a case where the determination based on the travel amount error ascertains the positioning result to be less reliable but the determination based on the major axis error ascertains the positioning result to be highly reliable. Namely, S406 results in YES and S430 results in No. It is possible to determine that at least one of the previous positioning result and the vehicle travel information is questionable. In this case, the present positioning result is highly reliable and it is possible to consider that the GNSS environment is changed for the better. The UE-based system continues to be active as the positioning system and waits until the positioning accuracy is improved.

Other Embodiments

The present disclosure is not limited to the above-mentioned embodiments illustrated in the accompanying drawings but may be modified, combined, or enhanced variously within the spirit and scope of the disclosure.

Numeric values given in the above-described embodiments are examples and the present disclosure is not limited thereto.

The positioning device according to the present disclosure is not limited to the in-vehicle device 1 but any device that positions the vehicle 2. For example, the positioning device may represent a mobile communication device such as a mobile terminal carried by an owner of the vehicle 2 into the vehicle.

The vehicle travel information may include information capable of estimating a travel direction of the vehicle 2 based on a predetermined lapse of time in place of or in addition to the information capable of estimating a travel amount of the vehicle 2 based on a lapse of time. In this case, there may be a difference between the travel direction of the vehicle 2 estimated based on the vehicle travel information and a travel direction of the vehicle 2 calculated based on the positioning result. When the difference exceeds a predetermined determination threshold value, the selection unit 22 can determine that the positioning result is invalid, namely, the positioning result accuracy falls short of a required level.

The in-vehicle device 1 may be mounted with a group of sensors capable of providing information comparable to the information included in the in-vehicle devices 9 through 12. In this case, the information acquisition unit 21 can acquire the vehicle travel information from the group of sensors mounted on the in-vehicle device 1 without using the communication network 8.

The present disclosure has been described with reference to the embodiments but is not limited to the embodiments and structures. The present disclosure covers various modification examples and modifications within a commensurate scope. In addition, the category or the scope of the idea of the present disclosure covers various combinations or forms and moreover the other combinations or forms including only one element or more or less in the former.

What is claimed is:

1. A positioning device configured to perform positioning to measure a position of a vehicle, the positioning device comprising:
a device-side reception unit configured to receive a signal including satellite orbit data transmitted from a GNSS satellite;
a device-side calculation unit configured to perform a positioning calculation based on the signal;
a communication unit configured to communicate with a positioning server that includes an assist data acquisition unit configured to acquire GNSS assist data including the satellite orbit data and a server calculation unit configured to perform the positioning calculation based on the GNSS assist data;
a selection unit configured to select, as a system for the positioning, one of a first positioning system and a second positioning system, the first positioning system configured to acquire a positioning result as a result of the positioning by the device-side calculation unit preforming the positioning calculation, the second positioning system configured to acquire the positioning result by the server calculation unit preforming the positioning calculation; and
an information acquisition unit configured to acquire vehicle travel information that is available from a device provided in the vehicle, related to a travel of the vehicle, and different from information used for the positioning, wherein:

when the first positioning system is selected, the selection unit determines whether the positioning result is valid based on the vehicle travel information; and when determining that the positioning result is invalid, the selection unit changes the system to the second positioning system.

2. The positioning device according to claim 1, wherein
the vehicle travel information includes information for estimating at least one of a travel amount and a travel direction of the vehicle in a predetermined lapse of time; and when at least one of a difference between the travel amount estimated based on the vehicle travel information and a travel amount calculated based on the positioning result and a difference between the travel direction estimated based on the vehicle travel information and a travel direction calculated based on the positioning result exceeds a predetermined determination threshold value, the selection unit determines that the positioning result is invalid.

3. The positioning device according to claim 1, wherein
when a service or an application based on the positioning result starts, the selection unit changes the system according to a characteristic of the service or the application.

4. The positioning device according to claim 1, wherein
the selection unit changes the system to the second positioning system when the first positioning system is selected and a DOP value acquired from the positioning result exceeds a predetermined threshold value.

5. The positioning device according to claim 1, wherein
the selection unit changes the system to the second positioning system when the first positioning system is selected and a major axis error acquired from the positioning result exceeds a predetermined threshold value.

6. A positioning device configured to perform positioning to measure a position of a vehicle, the positioning device comprising:

a device-side receiver configured to receive a signal including satellite orbit data transmitted from a GNSS satellite;

a transceiver configured to communicate with a positioning server that includes an assist data acquisition unit configured to acquire GNSS assist data including the satellite orbit data and a server calculation unit configured to perform the positioning calculation based on the GNSS assist data; and a processor configured to:

perform a positioning calculation based on the signal received by the device-side receiver;

select, as a system for the positioning, one of a first positioning system and a second positioning system, the first positioning system configured to acquire a positioning result as a result of the positioning by the processor preforming the positioning calculation, the second positioning system configured to acquire the positioning result by the server calculation unit preforming the positioning calculation; and acquire vehicle travel information that is available from a device provided in the vehicle, related to a travel of the vehicle, and different from information used for the positioning, wherein:

when the first positioning system is selected, the processor determines whether the positioning result is valid based on the vehicle travel information; and when determining that the positioning result is invalid, the processor changes the system to the second positioning system.

* * * * *